United States Patent [19]
Eckerdt

[11] 3,712,725
[45] Jan. 23, 1973

[54] FILMSTRIP ADAPTER FOR SLIDE PROJECTOR

[75] Inventor: George H. Eckerdt, Rochester, N.Y.

[73] Assignee: Eastman Kodak Company, Rochester, N.Y.

[22] Filed: April 13, 1970

[21] Appl. No.: 27,519

[52] U.S. Cl. .................353/68, 353/95, 353/101
[51] Int. Cl. ......G03b 23/00, G03b 21/00, G03b 3/00
[58] Field of Search...353/95, 96, 68, 122, 101, 103-117, 353/100

[56] References Cited

UNITED STATES PATENTS 2,856,812  10/1958  Barron ...............................353/68
2,553,075  5/1951  Bradford ..............................353/68

*Primary Examiner*—Leonard Forman
*Assistant Examiner*—A. J. Mirabito
*Attorney*—Robert W. Hampton and D. Peter Hochberg

[57] ABSTRACT

An adapter for enabling a slide tray projector to project filmstrip has a filmstrip advancing mechanism operated by the projector tray advancing means, and a focusing mechanism responsive to the operation of the projector focusing mechanism. The adapter is secured to the projector by the projector lens mount, and the projector lens assembly is attached to the adapter in a mount having an axis on the projection axis of the projector.

11 Claims, 8 Drawing Figures

GEORGE H. ECKERDT
INVENTOR.

BY D. Peter Hochberg
Robert W Hampton

ATTORNEYS

GEORGE H. ECKERDT
INVENTOR.

BY

ATTORNEYS

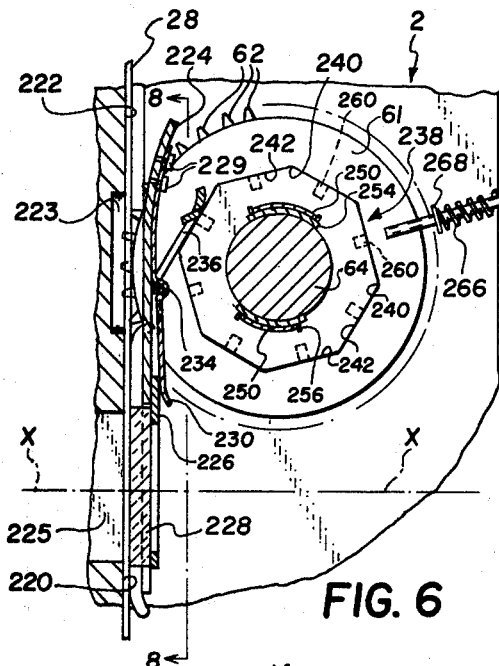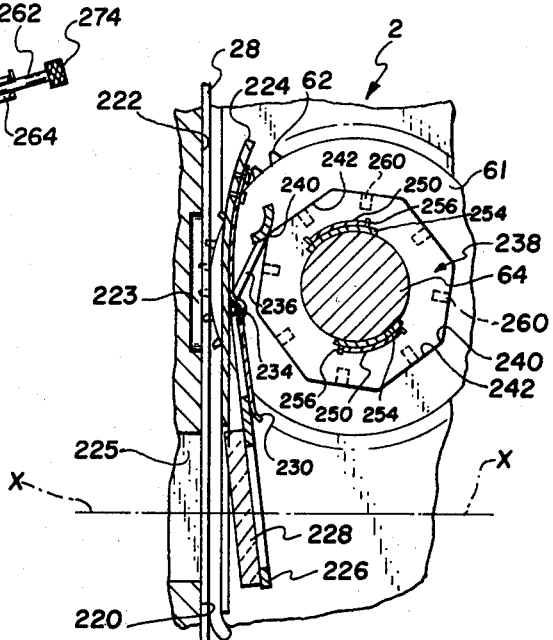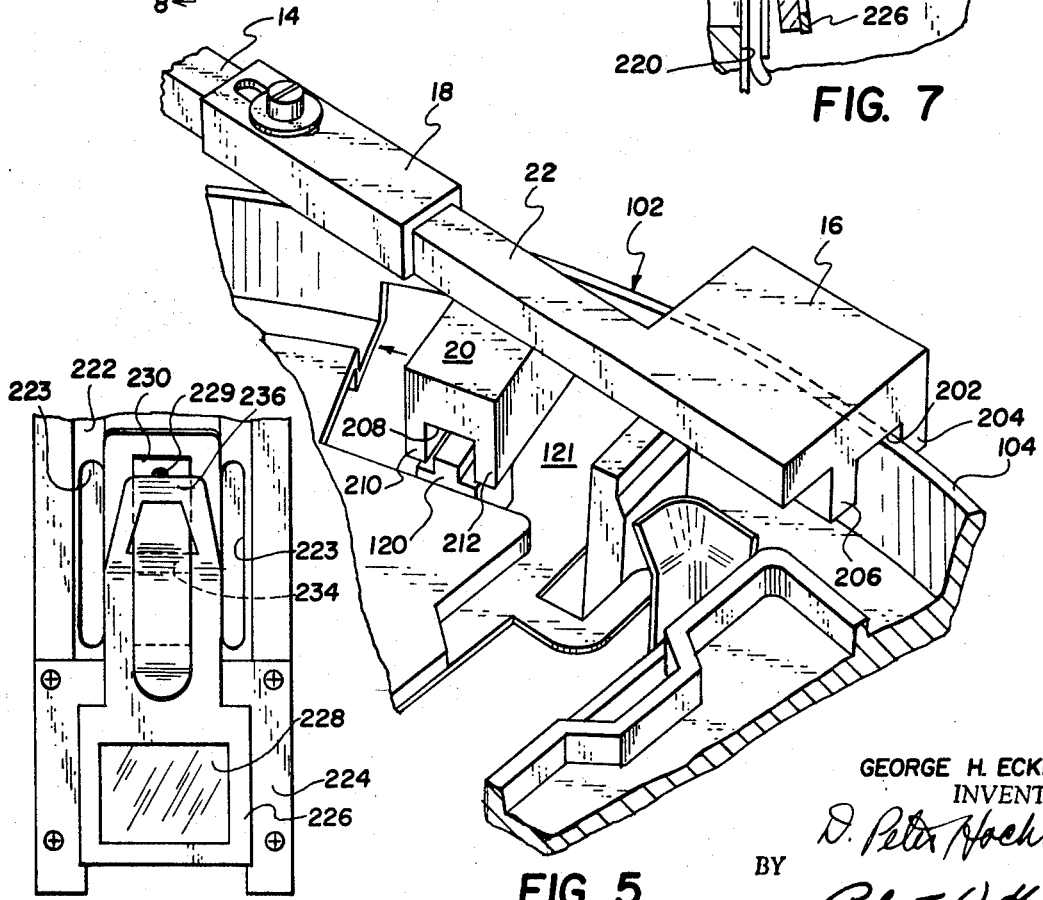

FILMSTRIP ADAPTER FOR SLIDE PROJECTOR

CROSS-REFERENCE TO RELATED APPLICATION

Reference is made to commonly assigned copending U.S. Pat. application Ser. No. 27,621, entitled "Linkage," filed on even date herewith in the name of George H. Eckerdt.

BACKGROUND OF THE INVENTION

1. Field of the Invention

The present invention relates to devices which are removably mounted on slide projectors for adapting the projector to receive and advance filmstrip. The present invention more specifically relates to filmstrip adapters for slide projectors, wherein the adapter utilizes the projector slide carrier advancing mechanism and the camera projection lens focusing system, to accomplish the functions of advancing the filmstrip and focusing the projector.

2. Description of the Prior Art

Slide transparency units, or simply "slides," comprise an image bearing photographic transparency, mounted in a rigid support frame or mount. The image is generally projected to a screen for viewing. Although slides are presently the more popular image carrying medium for still picture projection, photographic transparencies in the form of filmstrip are also widely used. The prior art teaches a number of projectors for alternatively receiving, projecting, and advancing filmstrip and slides, including those projectors disclosed in U.S. Pat. Nos. 2,783,680 to Goldberg; 2,793,563 to Koskela, and 2,856,812 to Barron, Jr. U.S. Pat. Nos. 2,438,333 to Dickman, and 2,712,268 to Dietmann, disclose attachments for enabling motion picture projectors to receive and project still pictures from filmstrip. Copending and commonly assigned U.S. Pat. application Ser. No. 797,909, filed on Feb. 10, 1969 by Jungjohann et al, discloses a manually operable adapter for a slide projector for showning still pictures from a filmstrip. With the exception of the last mentioned reference, the prior art does not disclose any filmstrip adapters for slide projectors. A fortiori, the prior art does not teach filmstrip adapters which utilize the mechanisms for indexing slide trays and for focusing projection lens systems incorporated in some popular slide projectors when such an adapter is used therewith.

SUMMARY OF THE INVENTION

An object of the present invention is to provide a filmstrip adapter, for use with a slide projector having a slide carrier indexing mechanism, wherein filmstrip is incrementally advanced through a film gate by the projector indexing mechanism.

A more specific object of the invention is the provision of a filmstrip adapter, for a slide projector of the type which receives a horizontal circular slide tray and indexes the tray by the incremental rotation thereof to present slides sequentially for projection, which adapter utilizes the projector indexing mechanism to advance filmstrip through a film gate.

Another object of the present invention is to provide a filmstrip adapter, for a slide projector having a lens focusing mechanism, wherein the projection lens system used with the adapter is focused by the projector focusing mechanism.

A further object of the present invention is to provide, for a slide projector, a filmstrip adapter which does not necessitate the use of a special projection lens assembly, but rather utilizes the lens assembly of the projector.

Yet another object of the present invention is to provide an adapter of the aforementioned type which can be easily mounted on a slide projector.

Still another object of the present invention is the provision of a filmstrip adapter for a slide projector wherein means are provided for framing filmstrip in the adapter film gate.

A still further object is the provision of an improved and uncomplicated filmstrip adapter for a slide projector which is economical to manufacture, and easy to attach to a slide projector and operate. Other objects will become apparent from the description to follow and the appended claims.

A filmstrip adapter according to a preferred embodiment of the invention is especially suitable for use with a slide projector of the type which includes a mechanism for focusing the projection lens system, and which further includes a mechanism for indexing a received slide tray to present slides in sequence to a projection station. The adapter contains a linkage for coupling the projector focusing mechanism with a focusing mechanism in the adapter, whereby the projection lens system used in the adapter is focused by the operation of the projector mechanism.

The adapter is preferably attached to the projector by removing the projector lens assembly from the lens mount and securing the adapter in the mount. The adapter lens mount is preferably structured to receive the projector lens assembly, thus obviating the need to use a special lens assembly in the adapter.

The adapter further contains a set of sprocket wheels for advancing perforated filmstrip through a film gate, and includes a linkage coupling the projector indexing mechanism with the sprocket wheels, whereby operation of the indexing mechanism effects advancement of filmstrip through the adapter film gate in single frame increments. The adapter further includes a framing mechanism and an override for manually advancing filmstrip through the adapter.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 5 is an enlarged, partial perspective view of the apparatus shown in FIG. 1, and shows the manner in which the adapter is connected to the indexing mechanism of the projector;

FIGS. 6 and 7 are partial side elevations taken through the line 6—6 in FIG. 2, and illustrate part of the adapter advancing mechanism at different phases of an operational sequence; and FIG. 8 is a partial front plan view taken through the line 8—8 in FIG. 6, and depicts the adapter elements near the film gate.

DETAILED DESCRIPTION OF THE INVENTION

The following description will be directed to a filmstrip adapter according to the invention which is designed for use with a slide projector of the type disclosed in U.S. Pat. No. 3,276,314 to Robinson, and incorporating an indexing mechanism of the type disclosed in U.S. Pat. No. Re. 26,789 to Robinson et al. A slide projector of the above type normally receives in horizontal position a circular slide tray containing a plurality of slides for projection and having lugs extending from the bottom portion thereof, by means of which the tray is indexed. The indexing mechanism includes a drive member which engages the lugs in sequence to rotate the tray. It is to be understood that slide projector and filmstrip adapter elements not specifically shown or described may take various forms well known to those skilled in the art. It is further to be understood that the invention is not limited in its application to use with slide projectors and indexing mechanisms of the aforementioned type, but can be adapted for use with other such apparatus as well.

Figure 1:
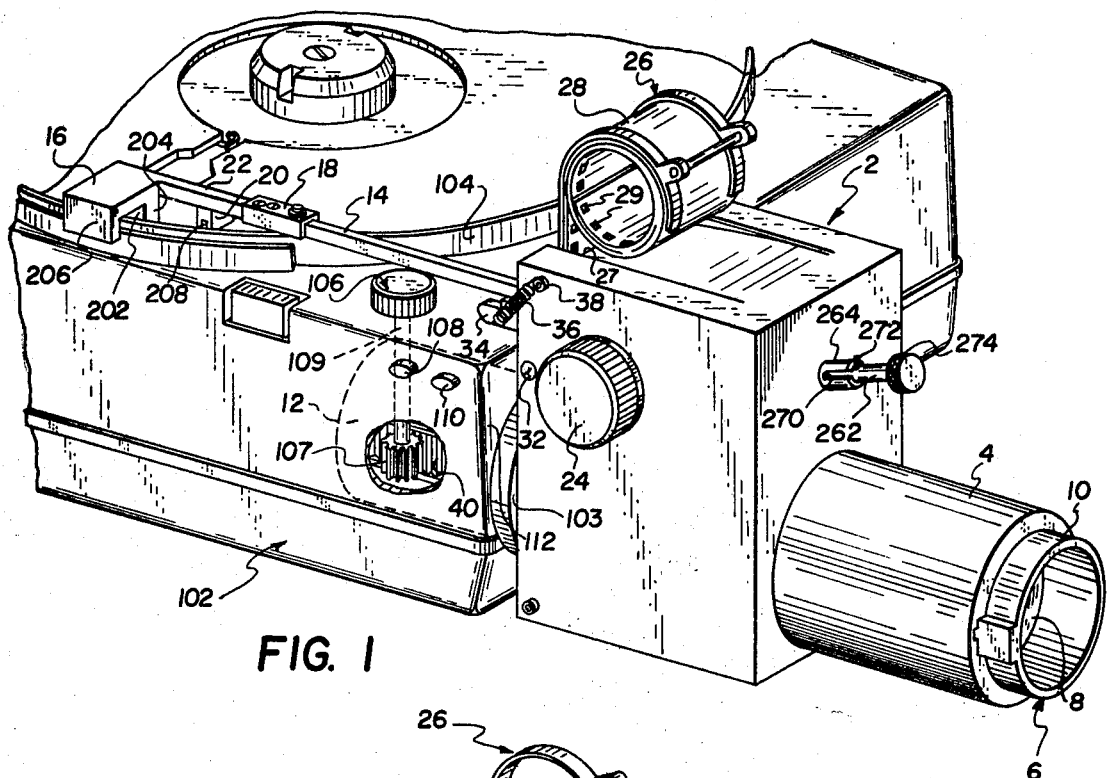
FIG. 1 is a pictorial of a filmstrip adapter according to the invention mounted on a slide projector.

Referring to FIG. 1, an adapter 2 is shown mounted on a slide projector 102, the latter being of the type disclosed in U.S. Pat. No. 3,276,314. Adapter 2 includes a lens mount 4 in which is inserted a lens assembly 6, the latter including 2 lens system 8 mounted in a lens barrel 10. Adapter 2 is mounted in projector 102 by means of a connecting barrel 12 (shown by the dotted lines) which is structured to be received and locked in projector lens mount 103. An arm 14, comprising a portion of the adapter filmstrip advancing mechanism, extends from adapter 2 and is coupled to a guide member 16 by a couple 18. A connecting member 20 depends from an arm 22 of guide member 16, and is engageable by the projector indexing mechanism for effecting the advancement of filmstrip through the adapter in a manner to be described hereinafter. Also to be described subsequently is a camming device which directs guide member 16 and connecting member 20 into their operative positions when the adapter is attached to projector 102. The adapter in FIG. 1 further includes a framing knob 24, a filmstrip holder 26, and a pin 262, the functions of which are all to be described below. Filmstrip 28 is loaded in adapter 2 for advancement therethrough.

The relevant portions of projector 102 are shown in FIG. 1, and include an annular lip 104 in which a circular slide tray is normally inserted, a focusing knob 106 for rotating a pinion 107 connected to the knob by a shaft 109, and forward and reverse indexing buttons 108 and 110. Knob 106 and buttons 108 and 110 control the position of a received lens along a set of positions along the projector's optical axis in a known manner to focus the projected image.

Figure 2:
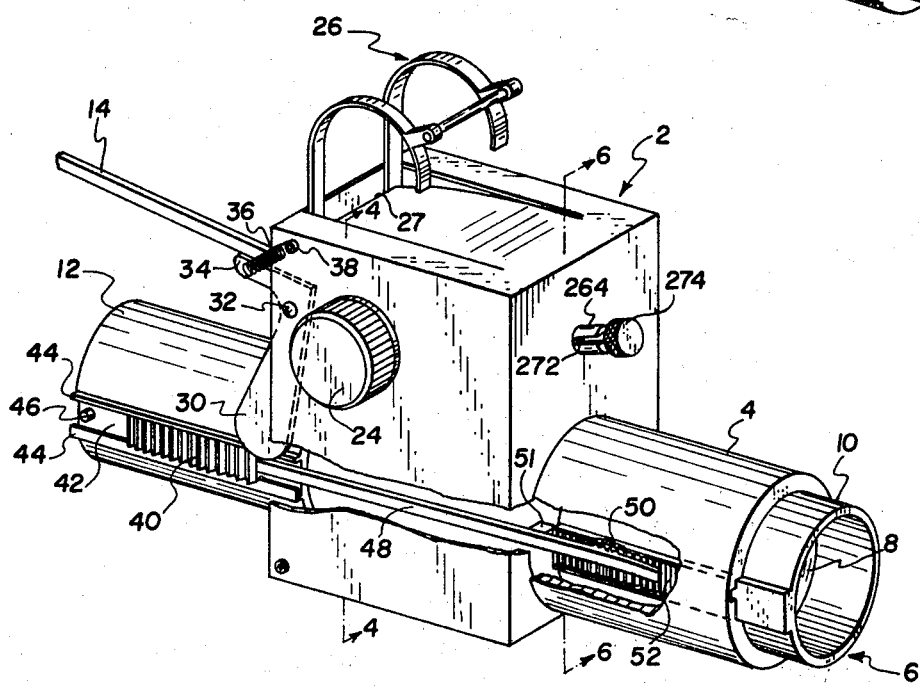
FIG. 2 is a perspective of the adapter illustrated in FIG. 1, with portions cut away to reveal the components used for focusing the projection lens assembly mounted in the adapter.

Referring to FIG. 2, adapter 2 further comprises a cam 30, pivotally mounted in the adapter on an axle 32 which extends into the adapter. Cam 30 includes an arm 34 to which is connected a spring 36, the latter element being connected at its other end to a post 38. By means of spring 36, cam 30 is biased in a clockwise direction. Arm 34 is an engagement with arm 14 which is mounted for pivotal movement inside adapter 2. Adapter 2 is mounted on projector 102 by properly orienting connecting barrel 12 as explained below and inserting it into projector lens mount 103. As connecting barrel 12 is so inserted, cam 30 engages the front wall 112 of projector 102 and is rotated in a counter-clockwise direction about axle 32, thereby causing arm 14 and the elements connected thereto to follow a similar counterclockwise path. The dimensions of cam 30 and the elements cooperating therewith are such that, when the adapter is fully seated on projector 102, guide member 16 moves into position on projector lip 104, and connecting member 20 engages the projector indexing mechanism.

After attachment of adapter 2 to projector 102, a projection lens system must be installed in the adapter for projecting images on a screen. Preferably, the interior of lens mount 4 is designed to receive the same projection lens assembly which projector 102 would normally receive. Hence, after removal of the projection lens assembly from projector 102 to enable the installation of adapter 2 in projector lens mount 103, the projection lens assembly is then installed in adapter lens mount 4. Projection lens assembly 10 shown inserted in lens mount 4 is presumed to be the projection lens assembly which is normally received by projector 102. Of course, filmstrip 28 must be loaded in adapter 2 prior to commencement of the projection of images therefrom, an operation which will be discussed subsequently.

As mentioned previously, projector 102 includes mechanisms for focusing the projection lens system received on the projector, and for indexing a circular slide tray received thereon. The filmstrip adapter according to the invention in effect transfers the output of the latter mechanisms to components in the adapter for accomplishing analogous functions on adapter 2. It should be noted that, if projector 102 were the type which only performed one of these functions, adapter 2 could accordingly be modified to perform only the function analogous to that which adapter 102 were designed to perform, or adapter 2 could be provided with means for disabling the portion thereof for which no corresponding mechanism were provided on projector 102.

The following discussion of the construction and operation of the preferred embodiment of the filmstrip adapter will be divided into two parts: the first referring to the means and manner of focusing the projector lens assembly mounted in the adapter, and the second referring to the means and manner of advancing filmstrip through the adapter. In FIG. 2, the components of the filmstrip adapter 2 which relate to the focusing of a projection lens assembly mounted in the adapter are shown. A rack 40 is slidably mounted in a recessed track 42 defined by parallel rails 44 provided in connecting barrel 12 of the adapter. Rack 40 corresponds to a rack provided on the lens assembly normally received by projector 102 (i.e. lens assembly 6). Pinion 107 in projector 102 is rotated in response to the rotation of knob 106 (or equivalent means such as a motor)

for engaging the rack of a received lens assembly, or in the present case rack 40, to displace the rack to move lens assembly 6 along a set of positions along the projector's optical axis to focus the lens assembly being used. Naturally, connecting barrel 12 must be properly oriented when inserted in projector lens mount 103 to effect the proper engagement of various adapter elements with projector 102, and guide members can be provided. The mating portions of rack 40 and rails 44 are dovetailed to prevent rack 40 from falling out of track 42, and stops 46 (only one of which is shown) are provided at opposite ends of track 42 to prevent rack 40 from sliding out of the track.

An arm 48 is connected to the forward end of rack 40 and is displaceable in response to the displacement of rack 40. Attached to the other end of arm 48 is a claw 50 coupled to lens assembly 6 and movable with arm 48 is a claw 50 coupled to lens assembly 6 and movable with arm 48 to focus the lens assembly. Projection lens assembly 6 has fastened thereto a rack 52 extending along the cylindrical surface of barrel 10, and is normally engageable by the drive means of the projector focusing mechanism. Claw 50 engages rack 52 upon the insertion of lens assembly 6 in barrel 4, and arm 48 is held in place by the interior wall of lens mount 4. A stop member 51 is provided on arm 48, against which lens assembly 6 is seated upon its insertion in lens mount 4. Although the input to the focusing mechanism of the adapter is here shown as a gear drive, rack 40 could be replaced by an appropriate substitute when focusing is accomplished in the projector by some other mechanism such as a clutch assembly. Likewise, if some other means for focusing lens assembly 6 were provided rather than rack 52, rack 50 would be accordingly replaced.

Figure 3:
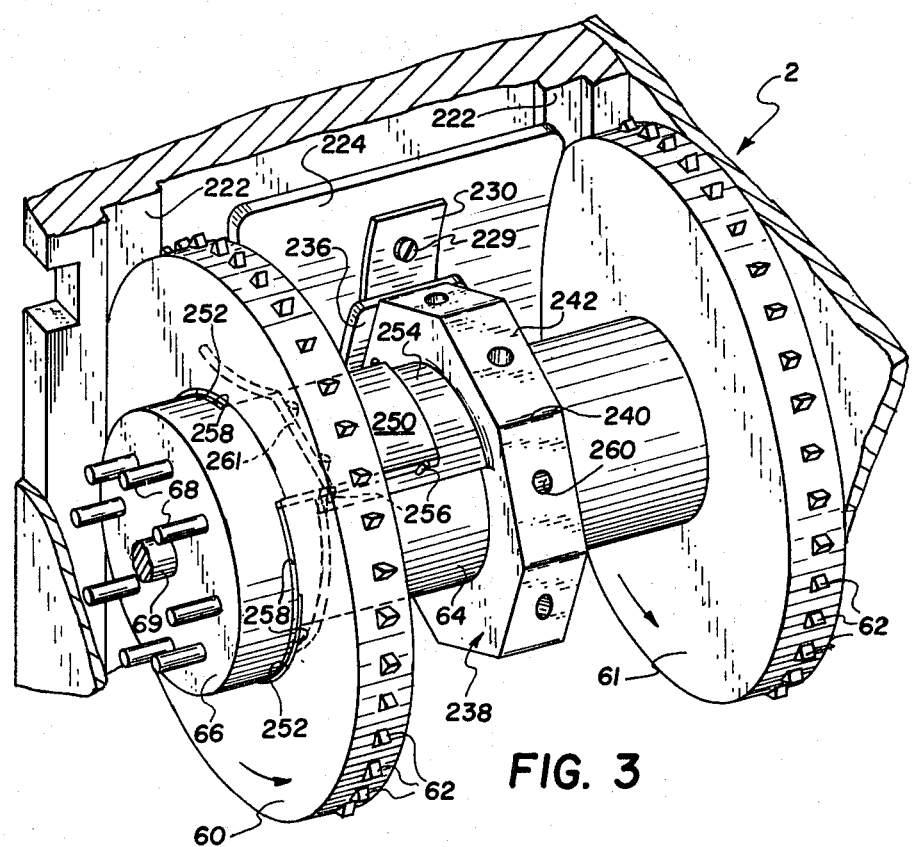
FIG. 3 is an enlarged partial front perspective view of the adapter filmstrip advancing mechanism.
Figure 4:
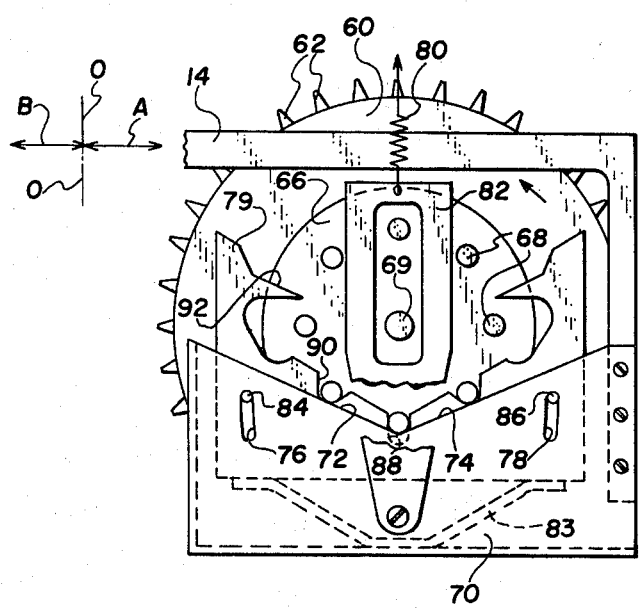
FIG. 4 is a partial side elevation taken through the line 4—4 in FIG. 2.

The means by which filmstrip 28 is transported through projector 2 are illustrated in FIGS. 3 and 4. Filmstrip 28 is of the conventional type, and contains a plurality of perforations 29 along the lateral edges thereof by means of which the film is advanced. Adapter 2 includes a pair of sprocket wheels 60, 61 which have extending from the peripheries thereof a plurality of sprockets 62 displaced from adjacent sprockets by a distance equal to the distance by which perforations 29 are separated from one another. Just as perforations 29 are in lateral alignment on the opposite edges of filmstrip 28, sprocket wheels 60, 61 are so oriented that corresponding sprockets 62 are in alignment as well. Sprocket wheels 60, 61 are mounted on axle 64 for rotation therewith, and are normally rotated in a clockwise direction as indicated by the arrows, to advance filmstrip 28 from the top of adapter 2 down towards the bottom thereof. Rotation is imparted to sprocket wheels 60 by means of a linkage of the type disclosed in previously cited U.S. Pat. application Ser. No. 27,621. Accordingly, an escape wheel 66 is coupled to axle 64 and has extending along the rotational axis thereof a shaft 69 keyed to axle 64. A plurality of pins 68 extends from the outer face of escape wheel 66, and pins 68 are disposed radially from shaft 69, by equal distances, and from each other by equal angular amounts. Pins 68 are so displaced from one another that rotation of escape wheel 66 by an angle equal to the angular displacement of pins 68, is such as to advance the filmstrip 28 by a distance equal to the length of a frame of film.

The basic components of the above-mentioned linkage are shown in FIG. 4. The linkage includes previously mentioned arm 14, an allochiral control member 70 which includes a pair of ramps 72, 74 and a pair of slots 76, 78, an allochiral pallet 79, a spring 80 coupled to control member 70 by a plate 82, and a leaf spring 83 mounted on control member 70 for biasing pallet 79 upwardly. The operation of the linkage will be explained in brief, and reference is made to the copending application for a more detailed description thereof.

Arm 14 is reciprocally displaceable in forward and reverse directions as indicated by arrows A and B, respectively, from an initial position indicated by line 0—0. Displacement of arm 14 in the rightward path indicated by arrow A effects the counterclockwise rotation of escape wheel 66 and sprocket wheels 60, 61 to advance filmstrip 28 from the top of adapter 2 down towards the bottom thereof, and displacement towards the left as indicated by arrow B effects the clockwise rotation of escape wheel 66 and sprocket wheels 60, 61 to displace filmstrip 28 towards the top of adapter 2. Assuming arm 14 is displaced in the forward direction, this motion is transferred to pallet 79 via pins 84 and 86 extending through slots 76 and 78 respectively. As arm 14 moves from the 0—0 position to the right, pallet 79 imparts torque in sequence to pins 68 which are initially in notches 88 and 90 respectively of pallet 79. As arm 14 proceeds in its rightward path, control member 70 follows a like path, and a pin 68 moves into engagement with a surface 92 of pallet 79. Pin 68 on surface 92 causes pallet 79 to pivot about pin 86 with pin 84 riding downwardly in slot 76. When pin 68 on surface 92 contacts ramp 72, further rotation of escape wheel 66 is precluded, regardless of the continued movement of arm 14 to the right. As mentioned, the linkage is so arranged that filmstrip 28 is transported through adapter 2 in frame length increments. The bias of spring 80 is such as to urge plate 82 to the vertical position shown in FIG. 4, and upon completion of the rightward displacement of arm 14, acts to return arm 14 to its initial position and reset the linkage for its next sequence of operations. The reverse operation of the linkage shown is identical with that just described, except the paths of movement of the various elements are reversed.

The means by which arm 14 is driven in its operational path is indicated in FIG. 5. FIG. 5 is an enlarged detail view of a portion of the indexing mechanism of projector 102 and of the means by which the output of this indexing mechanism is used to advance filmstrip 28 through adapter 2. As discussed previously, when adapter 2 is mounted on projector 102, guide member 16 and connecting member 20 are directed into their respective positions on projector 102. Accordingly, slot 202, defined by wall members 204 and 206 extending downwardly on guide member 16, receives annular lip 104. Similarly, slot 208, defined by walls 210 and 212 extending downwardly from connecting member 20, receives indexing member 120 of projector 102. In the normal operation of projector 102, indexing member 120 has an initial radial path of movement towards lip 104 to position indexing member 120 between the lugs extending downwardly from a received slide tray. Indexing member 120 then proceeds in a clockwise or counterclockwise path along projector surface 121 through a distance sufficient to index the tray in a clockwise or counterclockwise direction. The curved path of indexing member 120 is relatively short and for the present purposes can be considered to be linear.

The translation of the indexing motion of indexing member 120 into the advancement of filmstrip 28 through adapter 2 can now be understood. Assuming it is desired to advance filmstrip 28 downwardly through adapter 2, the forward indexing button 110 is depressed. Indexing member 120 then moves in its radial path along slot 208 and then proceeds in its counterclockwise path as indicated by the directional arrow in FIG. 5. When indexing member 120 moves in the latter path, connecting member 20 is driven in a similar path thereby displacing arm 14 and guide member 16 in a generally forward direction. The dimensions of the various components of the above-described linkage are such that escape wheel 66 will necessarily rotate a distance sufficient to advance a filmstrip 28 a frame length in response to the movement of indexing member 120 along its indexing path. Thus, in response to the movement of indexing member 120 through its prescribed path, corresponding motion is imparted to sprocket wheels 60, 61 via the linkage discussed above, and filmstrip 28 is transported through adapter 2 in the desired direction.

Referring to FIGS. 3, 6, 7 and 8, filmstrip 28 is incrementally advanced along a track which is composed of a pair of parallel, possibly teflon coated rails 222 along which the lateral edges of filmstrip 28 ride as the filmstrip proceeds through adapter 2. As already explained, sprocket wheels 60, 61 sequentially engage perforations 29 to transport filmstrip 28, and recesses 223 are provided in rails 222 opposite the film engaging location of the sprocket wheels to permit sprockets 62 to extend through perforations 29. The frames of filmstrip 28 are sequentially located on seating surface 220 for the projection of images therefrom. Surface 220 defines an aperture 225 lying on the optical axis X—X of lens system 8, and serves as the back film gate of the adapter. Filmstrip 28 is seated in projection position against back gate surface 220 by a front gate member 226 to maintain the frame in a flat position to optimize the image projected therefrom. Front gate member 226 defines an aperture in which the frame of film being projected is positioned, and includes a plate of glass 228 which extends over the latter aperture and is engageable with surface 220 as shown in FIG. 6. Front gate member 226 is biased against back gate member 224 by a strong leaf spring 230 which is connected to a plate 224 by means of screws 229.

In order to advance filmstrip 28 across back gate surface 220, it is necessary to lift front gate member 226 from surface 220 so that the path of the filmstrip across the surface will not be impeded. Accordingly, front gate member 226 is mounted on a hinge 234 fastened to plate 224, and a forwardly bent arm 236 extends from front gate member 226 so that the rearward (counterclockwise) displacement thereof causes front gate member 226 to pivot about hinge 234, thereby raising front gate member 226 from back gate surface 220 as indicated in FIG. 7 to allow the passage of filmstrip across the back gate surface. It is necessary that front gate member 226 be seated whenever a frame of film is in the projection position, but that it be raised at other times to permit film advancement. Accordingly, a cam 238 is mounted on axle 64 for rotation therewith. Cam 238 has an octagonal cross section, and thus contains 8 pointed sections 240. It is to be understood that the number of pointed sections 240 corresponds to the length of filmstrip advanced per operation of the advancing mechanism. Cam 238 is so oriented on axle 64 in relation to the other elements of the filmstrip advancing components, that during the film advance cycle of the apparatus one of points 240 is in engagement with arm 236 as shown in FIG. 7, but a flat portion 242 is opposite arm 236 as in FIG. 6 when a frame of film is seated across aperture 225.

Projection is accomplished in the ordinary manner, by projecting light from a source in projector 102 along the optical axis X—X, through aperture 225, and a frame of film seated on surface 220, through glass 228, and finally through lens system 8 to the projection screen.

Filmstrip is initially loaded in adapter 2 by sliding a roll of filmstrip into holder 26, and pushing the leading end of the filmstrip into entrance slot 27 and into engagement with sprocket wheels 60, 61. Thereafter, it is usually necessary to frame the strip, that is, to adjust the filmstrip in the film gate, so that full frames are projected onto the projection screen. Accordingly, means are provided for disconnecting sprocket wheels 60, 61 from their driving engagement with escape wheel 66 to enable the rotation of sprocket wheels 60, 61 independent of escape wheel 66. To facilitate the understanding of the present feature, it will be helpful to understand the manner in which the rotation of escape wheel 66 is imparted to sprocket wheels 60, 61 and cam 238. Escape wheel 66 has extending therefrom a pair of arms 250 as shown in FIG. 3 (only one of which is shown, an identical one being disposed 180° around escape wheel 66) which pass through annular slots 252 in sprocket wheels 60 and terminate in proximity of cam 238. Arms 250 have a radius of curvature slightly greater than the radius of axle 64 and are concentric with the latter. A similar pair of identical arms 254 extend toward escape wheel 66 from cam 238 and are shaped to engage the surface of axle 64. Sets of studs 256 protrude radially upwardly from arm 254, and are so arranged that when arms 250 are arranged in a superimposed relationship with arms 254, arms 250 are engaged on their lateral edges by studs 256. It may thus be seen that escape wheel 66 and cam 238 act as an integral member, and that arms 250 and 254 have been provided as shown to facilitate the assembly of the apparatus.

Slots 252 extend part way around sprocket wheel 60, for example 120 each, to permit the rotational movement of sprocket wheels 60, 61 relative to escape wheel 66 to frame the filmstrip in the film gate. A cork-like, or resinous pad 258 is provided on the back face of escape wheel 66, and the outer face of sprocket wheel 60 is engageable with pad 258. Escape wheel 66 is urged by a horseshoe clip 261 against sprocket wheel 60 through pad 258 with sufficient force so that sprocket wheels 60, 61 will rotate with escape wheel 66 in response to the application of torque to the latter, but sprocket wheels 60, 61 can be rotated alone when escape wheel 66 is held stationary. It can be seen then, that pad 258 acts as a clutch which is normally engaged, but which can be overridden by locking the escape wheel 60-cam 238 combination against rotation while imparting torque to sprocket wheels 60, 61. In order to lock the escape wheel-cam combination to permit the framing adjustment, there is provided a plurality of recesses 260 extending radially inward from the center of flat sections 242 of cam 238 as indicated in FIGS. 3, 6 and 7, and a pin 262 extending between a pair of annular guide members 264 for insertion into one of recesses 260. Pin 262 is urged inward towards cam 238 by a spring 266 which is connected at one end to flange 268 on pin 262 and at its other end to the housing of adapter 2. Guide members 264 define a slot 270 which is of sufficient width to permit a lug 272 which extends radially from pin 262, to ride therein. In order to lock cam 238, pin 262 is rotated by means of knurled cap 274 to align lug 272 with slot 270 to permit a displacement of pin 262 toward cam 238 as indicated in FIG. 2. After the framing operation has been completed, pin 262 can be manually moved away from cam 238 until lug 272 clears guide members 264, and then slightly rotated so that one of guide members 264 is in blocking engagement with lug 272 as indicated in FIG. 1.

Thus, framing is accomplished as follows. Pin 262 is rotated as explained and allowed to be driven towards cam 238. Manual film advancing knob 24 is rotated slightly until a recess 260 moves into alignment with pin 262, and the latter falls into the recess to lock cam 238 and escape wheel 66 in place. With cam 238 so locked, knob 24, which is keyed to axle 64 and hence fixed relative to sprocket wheels 60, 61, is rotated to position a frame of film in the film gate. Pin 262 is then withdrawn from recess 260 and rotated to hold it in its inactive position. Then, the normal operation of projector 102, and the responsive operation of adapter 2, can be commenced. Should the manual advancement of filmstrip through adapter 2 be desired, all that is necessary is the rotation of knob 24.

The adapter of the present invention makes possible numerous special features which have been developed for use with slide projectors. The possibility of forward and reverse directions of film advance has already been mentioned. Slide projectors have recently been developed which permit programmed slide projection, such as where code means are provided on the slide unit or on cooperating tapes for "telling" the projector when to advance the next film frame for projection. The adapter according to the invention can make full use of such programming. As long as the connecting member 20 remains engaged with the projector indexing member 120, automatic advance of the filmstrip through the adapter is quite feasible.

The invention has been described in detail with particular reference to preferred embodiments thereof, but it will be understood that variations and modifications can be effected within the spirit and scope of the invention.

I claim:

1. For use with a slide projector of the type including an indexable slide carrier and a slide carrier indexing mechanism, an adapter mountable on said projector for enabling the projector to receive and transport filmstrip for projection, said adapter comprising:
   means for receiving filmstrip;
   a projection station;
   means operable for transporting received filmstrip past said projection station; and
   means for interconnecting said transporting means and the projector indexing mechanism and for operating said transporting means in response to operation of the projector indexing mechanism.

2. For use with a slide projector of the type which includes (1) means for receiving a projection lens assembly for movement along the projector's optical axis between a first set of focusing positions and (2) means for so moving such a received projection lens assembly to focus the projected image, an adapter mountable on such a projector for enabling said projector to receive filmstrip and project images therefrom, said adapter comprising:
   means for receiving a projection lens assembly for movement between a second set of positions spaced from said first set of positions; and
   means for coupling the lens assembly moving means of the projector to a projection lens assembly in said second set of positions to focus such a projection lens assembly, said coupling means comprising (1) a first portion arranged to be engaged and displaced by the lens assembly moving means of the projector and (2) a second portion arranged to engage a received projection lens assembly at said second set of positions, said second portion being displaceable in response to displacement of said first portion for moving the received lens assembly along said second set of positions.

3. An adapter according to claim 2 wherein:
   the lens assembly moving means of the projector includes a displaceable gear, and
   said first portion is a gear engageable by the projector gear and displaceable in response to displacement of the projector gear.

4. An adapter according to claim 3 wherein:
   the projection lens assembly received in said second set of positions includes a gear on the exterior thereof, and
   said second portion comprises a claw engageable with the lens assembly gear for displacing the lens assembly in response to displacement of the projector gear.

5. For use with a slide projector of the type which includes (1) means for receiving a slide tray, (2) an operating station and (3) a mechanism for indexing the tray to present slides in sequence to the operating station, an adapter connectable with the projector for enabling the projector to receive and advance filmstrip and to project images therefrom, said adapter comprising:
   means for connecting said adapter to the projector;
   means defining a projection position;
   means for receiving and engaging filmstrip and for advancing the filmstrip past said projection position;
   a linkage coupled to said advancing means, said linkage being engageable with the projector indexing mechanism and displaceable in response to operation of the indexing mechanism for operating said advancing means; and
   means for guiding said linkage into operative engagement with the indexing means in response connection of said adapter to the projector.

6. For use with a projector of the type which receives a slide carrier and includes means for indexing a received slide carrier to present slides in sequence to an operating station, and further includes a mount for receiving a projection lens assembly, an adapter for enabling the projector to advance filmstrip past a projection position and to project images from the filmstrip, said adapter comprising:

means for attaching said adapter to the projector lens mount;

means for receiving filmstrip of the type which includes perforations sequentially engageable for transporting the filmstrip;

a projection station;

sprocket wheel means rotatable for engaging the perforations of received filmstrip and for transporting the filmstrip past said projection station; and a linkage for rotating said sprocket wheel means, said linkage including a connecting member engageable by the projector indexing means, and means for rotating said sprocket wheel by an amount sufficient to transport a length of film equal to one frame past said projection station in response to operation of the projection indexing means.

7. An adapter according to claim 6 further including means for engaging the projector and for guiding said connecting member into operative engagement with the projector indexing means in response to attachment of said adapter to the projector lens mount.

8. An adapter according to claim 6 further comprising:

a film gate member defining an aperture through which light can be projected from the projector and through a frame of film at said projection station;

a clutch coupling said sprocket wheel rotating means and said sprocket wheel; and means for setting said adapter in a first condition wherein said sprocket wheel rotating means and said sprocket wheel are coupled in driving engagement by said clutch, and for setting said adapter in a second condition wherein said clutch is disengaged from driving engagement from said sprocket wheel whereby said sprocket wheel can be rotated independently of said rotating means for framing filmstrip in said projection station.

9. An adapter according to claim 6 further comprising:

a front gate member for engaging and holding filmstrip flat in said projection station; and means for disengaging said front gate member from the filmstrip in response to the rotation of said sprocket wheel.

10. An adapter according to claim 6 wherein the projector with which said adapter is to be used further includes means for focusing a projection lens assembly receivable in the lens mount, said adapter further comprising:

a lens mount for receiving a projection lens assembly and defining a path along which a received projection lens assembly is displaceable for focusing the assembly; and means for coupling the projector focusing means and a projection lens assembly received in said adapter lens mount, whereby the projection lens assembly received by said adapter is displaced along said path in response to operation of the projector focusing means.

11. An adapter according to claim 6 further comprising means for manually rotating said sprocket wheel to transport filmstrip in said adapter.

* * * * *